(No Model.)
J. P. PEGG.
HAY RACK ELEVATOR.
No. 324,483. Patented Aug. 18, 1885.
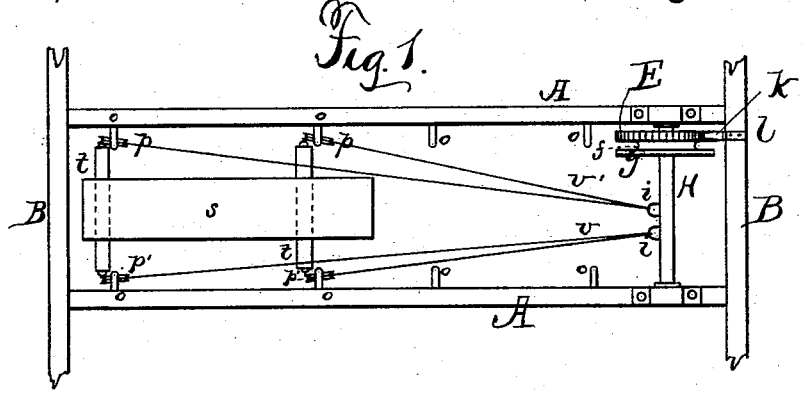
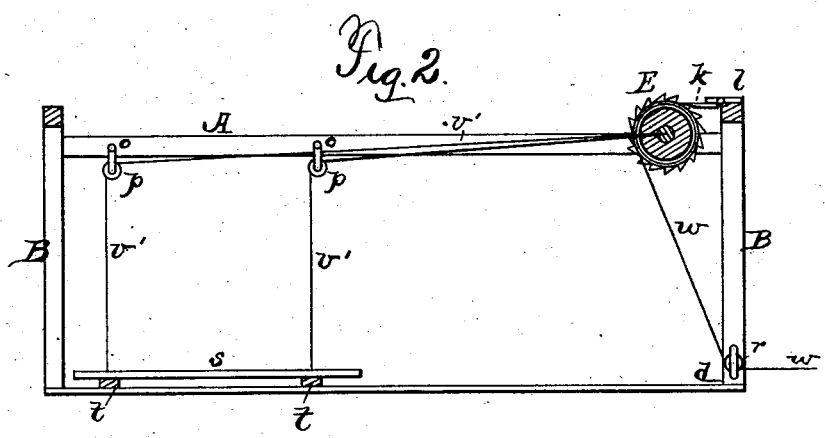
Witnesses:
T. H. Parsons
S. R. Thompson
James P. Pegg,
Inventor, by
T. H. Parsons,
Atty.

UNITED STATES PATENT OFFICE.

JAMES PETER PEGG, OF NORTH PELHAM, ONTARIO, CANADA.

HAY-RACK ELEVATOR.

SPECIFICATION forming part of Letters Patent No. 324,483, dated August 18, 1885.

Application filed October 8, 1884. (No model.)

*To all whom it may concern:*

Be it known that I, JAMES P. PEGG, of North Pelham, county of Welland, and Province of Ontario, have invented certain new and useful Improvements in Hay-Rack Elevators; and I do hereby declare that the following is a full, clear, and exact description of the same.

In the drawings, Figure 1 is a plan view of my invention; Fig. 2, a side view of the same in section.

It consists of a shaft, H, across the driveway of a barn, and rests on beams A A, at about the position shown. This shaft H revolves and has a large ratchet-wheel, E, and a large pulley, $g$, on one end. A dog, $k$, upon a hinge, $l$, is fastened to beam B and prevents the shaft H turning backward. Near the center of this shaft H two staples, $i$ $i$, are fastened, through which run ropes $v$ $v'$. The rope $v'$ passes to that side of driveway on which pulley $g$ is, over two adjustable swiveled pulleys, $p$ $p$, down below the rack $s$, (shown by dotted lines,) at side of the load, and fastened to two poles, $t$, under the rack $s$. The other rope, $v$, passes to the other side of driveway, through adjustable swiveled pulleys $p'$ $p'$, down below rack $s$, and fastened to the other ends of poles $t$. The pulleys $p$ $p$ $p'$ $p'$ are four in number, fastened by hooks $o$ $o$ to beams A A, at a distance apart equal to about the length of rack $s$. Thus by having other sets of hooks $o$ $o$ the rack may be raised in either front, middle, or back part of barn. On pulley $g$ a rope, $w$, (one end permanently fastened thereto,) is coiled in groove $f$, one end of which passes close to the floor $d$ and through a pulley, $r$. The team is hitched to this end of the rope $w$, and as fast as it unwinds from pulley $g$ the ropes $v$ $v'$ wind on shaft H, and the loaded rack is raised accordingly. The dog $k$ holds rack $s$ at any desired height. To lower the rack the dog $k$ is raised by any suitable means, and the rack sinks to the floor of its own weight.

I am aware that a rack-elevator has been used before, but the use thereof has been much impaired from the fact that the pulleys $p$ $p$ $p'$ $p'$ were stationary, and not being of the swiveled pattern, the ropes $v$ $v'$ on the shaft H did not line with the pulleys, and on this account were soon cut and worn off.

I claim—

In a hay-rack elevator, the shaft H, having rigidly attached to it the ratchet-wheel and pulley E $g$, staples $i$ $i$, in combination with hinged dog $k$, ropes $v$ $v'$, pulleys $p$ $p$ $p'$ $p'$, hooks $o$ $o$, and poles $t$ $t$, all substantially as specified.

In testimony whereof I affix my signature in presence of two witnesses.

JAMES PETER PEGG.

Witnesses:
    A. B. SHAW,
    W. B. GILLELAND.